United States Patent
Li et al.

(10) Patent No.: US 12,302,348 B2
(45) Date of Patent: May 13, 2025

(54) TIMING DETERMINATION METHOD AND COMMUNICATION DEVICE

(71) Applicant: VIVO MOBILE COMMUNICATION CO., LTD., Dongguan (CN)

(72) Inventors: Na Li, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 376 days.

(21) Appl. No.: 17/864,378

(22) Filed: Jul. 13, 2022

(65) Prior Publication Data

US 2022/0353898 A1    Nov. 3, 2022

Related U.S. Application Data

(63) Continuation of application No. PCT/CN2021/070545, filed on Jan. 7, 2021.

(30) Foreign Application Priority Data

Jan. 14, 2020  (CN) .......................... 202010036710.5

(51) Int. Cl.
H04W 72/12   (2023.01)
H04L 1/18    (2023.01)
(Continued)

(52) U.S. Cl.
CPC ........... *H04W 72/23* (2023.01); *H04L 1/1854* (2013.01)

(58) Field of Classification Search
CPC ... H04W 28/04; H04W 72/04; H04W 72/042; H04W 88/08; H04W 72/23; H04W 72/1289; H04L 5/0007; H04L 1/1854
(Continued)

(56) References Cited

U.S. PATENT DOCUMENTS 11,621,804 B2 *  4/2023  Gao ..................... H04L 5/0092
                                                       370/329
11,646,832 B2 *  5/2023  Rastegardoost .. H04W 74/0816
                                                       370/329
(Continued)

FOREIGN PATENT DOCUMENTS

CN    107846731 A  *  3/2018  ............ H04W 72/04
CN    108173627 A  *  6/2018  ........... H04L 1/1854
(Continued)

OTHER PUBLICATIONS

3GPP TSG RAN WG1 Meeting #92, Athens, Greece, Feb. 26-Mar. 2, 2018, R1-1802214, Agenda Item: 7.1.3.3.2, Source: LG Electronics, Title: Remaining issues on DL/UL scheduling and HARQ. (Year: 2018).*

(Continued)

Primary Examiner — Gbemileke J Onamuti
Assistant Examiner — Sanjay K Dewan
(74) Attorney, Agent, or Firm — IPX PLLC (57) ABSTRACT

A timing determination method and a communication device are provided. The timing determining method includes: acquiring first information, wherein the first information includes at least one of the following: a subcarrier spacing, band information, or a timing superposition domain; and determining a timing set from a first channel transmission to a second channel transmission according to the first information.

18 Claims, 2 Drawing Sheets

---

101 — Acquiring first information, wherein the first information includes at least one of the following: a subcarrier spacing, band information and a timing superposition domain and 102 — Determining a timing set from a first channel transmission to a second channel transmission according to the first information (51) Int. Cl.
  *H04L 1/1829* (2023.01)
  *H04W 72/23* (2023.01)
(58) Field of Classification Search
  USPC .......................................................... 370/329
  See application file for complete search history.

(56) References Cited

U.S. PATENT DOCUMENTS

| | | | | |
|---|---|---|---|---|
| 11,716,174 | B2* | 8/2023 | Zhou | H04W 72/23 |
| | | | | 370/329 |
| 2017/0349173 | A1* | 12/2017 | Nishiguchi | B60W 60/00 |
| 2018/0311580 | A1* | 11/2018 | Kim | A63F 13/2145 |
| 2019/0132092 | A1* | 5/2019 | Chen | H04L 1/1887 |
| 2023/0224095 | A1* | 7/2023 | Bae | H04L 1/1854 |
| | | | | 370/329 |

FOREIGN PATENT DOCUMENTS

| | | | | | |
|---|---|---|---|---|---|
| CN | 109803430 | A | * | 5/2019 | ............... H04L 1/18 |
| CN | 3 573 299 | A1 | * | 11/2019 | ............. H04L 27/26 |
| EP | 3573299 | A1 | | 11/2019 | |
| EP | 3588836 | A1 | | 1/2020 | |
| KR | 3 588 836 | A1 | * | 1/2020 | ............... H04L 5/00 |
| WO | WO2018053801 | A1 | * | 3/2018 | ........... H04L 5/0048 |

OTHER PUBLICATIONS

International Search Report issued in corresponding International Application No. PCT/CN2021/070545, mailed Mar. 9, 2021, 4 pages.

Extended European Search Report issued in related European Application No. 21741045.5, mailed Jan. 3, 2023, 10 pages.

LG Electronics, "Remaining issues on DL/UL scheduling and HARQ", 3GPP TSG RAN WG1 Meeting#92, R1-1802214, Feb. 2018, 6 pages.

First Office Action issued in related Chinese Application No. 202010036710.5, mailed Nov. 9, 2022, 7 pages.

* cited by examiner

TIMING DETERMINATION METHOD AND COMMUNICATION DEVICE

CROSS-REFERENCE TO RELATED APPLICATIONS

This application is a continuation of International Application No. PCT/CN2021/070545, filed Jan. 7, 2021, which claims priority to Chinese Patent Application No. 202010036710.5, filed Jan. 14, 2020. The entire contents of each of the above-referenced applications are expressly incorporated herein by reference.

TECHNICAL FIELD

The present disclosure relates to the technical field of communication, and in particular, to a timing determination method and a communication device.

BACKGROUND

With the development of communication technology, future communication systems, such as a New Radio (NR) system, may operate in high bands, such as 57 GHz to 71 GHz, and support large bandwidth carriers. In this case, the currently used Subcarrier Spacing (SCS), such as 60 KHz or 120 KHz, is no longer applicable, and it is necessary to introduce a larger SCS to meet the communication requirements.

However, in a case that the SCS is enlarged, the length of each symbol will be reduced. Therefore, scheduling timing or feedback timing among different channel transmission determined in the prior art will be small, which may not meet the requirement of the terminal processing time and will affect the transmission performance.

SUMMARY

Embodiments of the present disclosure provide a timing determination method and a communication device.

According to a first aspect, embodiments of the present disclosure provide a timing determination method, including:
  acquiring first information, wherein the first information includes at least one of the following: a subcarrier spacing, band information and a timing superposition domain; and
  determining a timing set from a first channel transmission to a second channel transmission according to the first information.

According to a second aspect, embodiments of the present disclosure provide a communication device, including:
  an acquisition module, configured to acquire first information, wherein the first information comprises at least one of the following: a subcarrier spacing, band information and a timing superposition domain; and
  a determination module, configured to determine a timing set from a first channel transmission to a second channel transmission according to the first information.

According to a third aspect, embodiments of the present disclosure provide a communication device, including a memory, a processor, and a computer program stored in the memory and capable of running on the processor, wherein when the computer program is executed by the processor, the steps of the timing determination method are implemented.

According to a fourth aspect, embodiments of the present disclosure provide a computer readable storage medium, storing a computer program, wherein when the computer program is executed by a processor, the steps of the timing determination method are implemented.

In the embodiments of the present disclosure, the required timing set can be determined flexibly by acquiring the first information which includes the SCS, the band information and/or the timing superposition domain, and by determining the timing set from the first channel transmission to the second channel transmission according to the first information, so that under the condition of enlarging the SCS, it can be ensured that the determined scheduling timing or feedback timing among different channel transmissions meets the terminal processing time, and the transmission performance can be performed.

BRIEF DESCRIPTION OF DRAWINGS

To describe the technical solutions in the embodiments of the present disclosure more clearly, the following briefly introduces the accompanying drawings for describing the embodiments. Apparently, the accompanying drawings in the following description show merely some embodiments of the present disclosure, and for the ordinary skill in the art, other drawings may be derived from these accompanying drawings without creative efforts.

DETAILED DESCRIPTION

To describe the technical solutions in the embodiments of the present disclosure more clearly, the following briefly introduces the accompanying drawings for describing the embodiments. Apparently, the accompanying drawings in the following description show merely some embodiments of the present disclosure, and for the ordinary skill in the art, other drawings may be derived from these accompanying drawings without creative efforts.

To facilitate the understanding of the embodiments of the present disclosure, firstly, the related k0 set, k1 set, and k2 set are described as follows.

1) The k0 set represents a scheduling timing set from a Physical Downlink Control Channel (PDCCH) transmission to a Physical Downlink Shared Channel (PDSCH) transmission scheduled by the PDCCH. In order to save the power of a terminal, cross-slot scheduling is introduced into PDSCH scheduling, that is, the PDCCH and the PDSCH scheduled by the PDCCH may be transmitted in different slots. The specific implementation is indicated by k0 in time domain resource assignment indication corresponding to the PDSCH, wherein k0 represents the offset slot number of the slot where the PDSCH is located relative to the slot where the PDCCH is located. In a case that the PDSCH and the PDCCH have different SCS, the time length of the slot corresponding to the PDSCH and the serial number of the slot, and the time length corresponding to the PDCCH and the serial number of the slot may be different, k0 represents the offset slot number of the slot where the PDSCH is located relative to the slot where the PDCCH is located, and the offset number is subjected to the SCS and slot corresponding to the PDSCH. At present, the k0 set (that is, the value range of k0) is {0, 1, . . . , 32}, wherein when k0 is equal to 0, it means that the PDCCH and the PDSCH scheduled by the PDCCH are in the same slot.

2) The k1 set represents a feedback timing set from a PDSCH transmission or PDCCH transmission to Hybrid Automatic Repeat request-ACK (HARQ-ACK) feedback corresponding to the PDSCH transmission or PDCCH transmission. In a case that the PDSCH or PDCCH and HARQ-ACK transmission channel (PUCCH) have different SCS, the time length of the slot/sub-slot corresponding to the PDSCH or PDCCH and the serial number of the slot/sub-slot, and the time length corresponding to the PUCCH and the serial number of the slot/sub-slot may be different, k1 represents the offset slot/sub-slot number of the time/sub-slot where the PUCCH is located relative to the slot/sub-slot where the PDCCH is located, and the offset number is subjected to the SCS and slot/sub-slot corresponding to the PUCCH. For example, in a case that a terminal UE receives a PDCCH transmission or a PDCCH transmission for indicating downlink Semi-Persistent Scheduling (SPS) release at a slot or a sub-slot n, and UE will feed back HARQ-ACK information of the PDSCH transmission or PDCCH transmission at a slot/sub-slot n+k1. For the dynamically scheduled PDSCH transmission (or SPS PDSCH transmission) and SPS release PDCCH transmission, k1 is indicated by a feedback timing indicator field (PDSCH-to-HARQ feedback timing indicator field, that is, k1) in the corresponding PDCCH (or activated PDCCH). At present, the k1 set (that is, the value range of k1) supported in NR is {0, 1, 2, . . . , 15}. For non-fallback Downlink Control Information (DCI), the PDSCH-to-HARQ_feedback timing indicator field may be 3 bits (for a DCI format 1_2, it may be 0 bit to 3 bits), a Radio Resource Control (RRC) signaling may configure 8 values (for the DCI format 1_2, it may be 1 value to 8 values) for the k1 set in {0, 1, 2, . . . , 15}, and the 3-bit PDSCH-to-HARQ_feedback timing indicator field in DCI respectively corresponds to 8 values configured by the RRC signaling (corresponding to the value configured by RRC). For the fallback DCI (DCI 1_0), the PDSCH-to-HARQ_feedback timing indicator field is 3 bits, and the corresponding k1 set is {1, 2, 3, 4, 5, 6, 7, 8} stipulated by a protocol.

After UE receives PDSCH, it is necessary to feed back HARQ-ACK information on a Physical Uplink Control Channel (PUCCH) or Physical Uplink Shared Channel (PUSCH) for the decoding result of PDSCH. In this period, UE will go through the processes such as channel estimation, PDSCH demodulation, decoding, HARQ-ACK codebook generation, HARQ-ACK coding and mapping to a physical resource. Therefore, it takes a certain time for the UE to feed back the HARQ-ACK information, wherein the required time is related to the processing capacity of the UE, SCS and other factors. Therefore, in a case that SCS is increased, it is necessary to properly modify the k1 set to meet the feedback requirement of UE.

3) The k2 set represents a scheduling timing set from a PDCCH transmission to a Physical Uplink Shared Channel (PUSCH) transmission scheduled by the PDCCH. For example, in a case that UE receives UL grant to schedule the PUSCH in a slot n, UE transmits a corresponding PUSCH in a slot n+k2. The specific implementation is indicated by k2 in a time domain resource assignment corresponding to the PUSCH, wherein k2 represents the uplink slot offset quantity of the slot where the PUSCH is located relative to UL grant. In a case that the PUSCH and the PDCCH have different SCS, the slot time length and the slot serial number corresponding to the PUSCH may be different from the time length and the slot serial number corresponding to the PDCCH, k2 represents the offset slot number of the slot where the PDCCH is located relative to the slot where the PUSCH is located, and the offset number is subjected to the SCS and slot corresponding to the PUSCH. At present, the k2 set (that is, the value range of k2) is {0, 1, . . . , 32}, wherein when k2 is equal to 0, it means that the PUSCH is sent in the uplink slot corresponding to UL grant.

After the UE receives UL grant, it is necessary to decode the UL grant and perform data transmission according to the scheduling information of the UL grant; therefore, it takes a certain time for the UE to send the PUSCH. The required time is related to the processing capacity of the UE, SCS and other factors. Therefore, in a case that SCS is increased, it is necessary to properly modify the k2 set to meet the transmission requirement of the UE.

In some embodiments, the wireless communication system provided by the embodiments of the present disclosure includes a terminal and a network device. The terminal may also be referred to as a terminal device or a User Equipment (UE). The terminal may be a terminal side device such as a mobile phone, a tablet personal computer, a laptop computer, a Personal Digital Assistant (PDA), a Mobile Internet Device (MID), a wearable device or a vehicle-mounted device. It should be noted that a specific type of the terminal is not limited in this embodiment of the present disclosure. The network device may be a base station or a core network. The base station may be a base station of 5G and later versions (for example, a gNB and a 5G NR NB), or a base station in other communication systems (for example, an eNB, a WLAN access point, or other access points). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or other appropriate terms in the art. Provided that the same technical effects are achieved, the base station is not limited to specific technical vocabulary.

The embodiments of the present application will be described in detail below with reference to the accompanying drawings.

Figure 1:
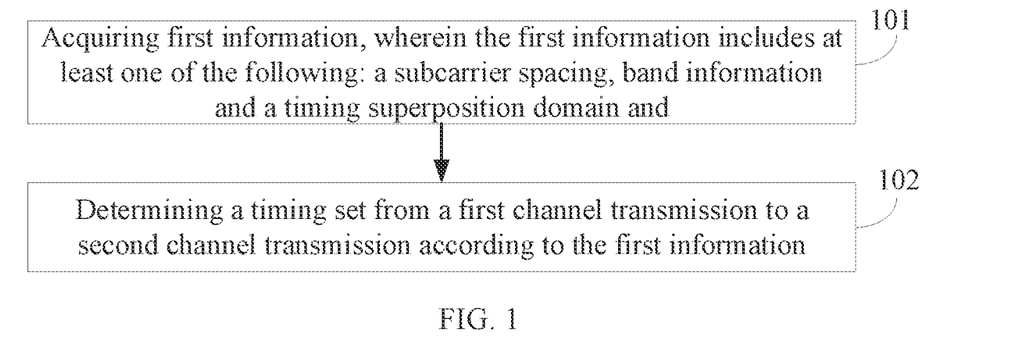
FIG. 1 is a flowchart of a timing determination method according to an embodiment of the present disclosure.

Referring to FIG. 1, FIG. 1 is a flowchart of a timing determination method according to an embodiment of the present disclosure. The method is applied to a communication device. The communication device may be a terminal or a network device so as to ensure that the terminal and the network device have a consistent understanding on the timing determination process. As shown in FIG. 1, the method includes the following steps:

Step 101: acquiring first information, wherein the first information includes at least one of the following: a sub-carrier spacing, band information, a timing superposition domain, or network configuration information.

Step 102: determining a timing set from a first channel transmission to a second channel transmission according to the first information.

In some embodiments, the timing set from the first channel transmission to the second channel transmission may include one of the following:

a scheduling timing set from a PDCCH transmission to a PDSCH transmission scheduled by the PDCCH, for example, the scheduling timing set is a k0 set;

a feedback timing set from a PDSCH transmission to HARQ-ACK feedback corresponding to the PDSCH transmission, for example, the feedback timing set is a k1 set;

a feedback timing set from a PDCCH transmission to HARQ-ACK feedback corresponding to the PDCCH transmission, wherein the feedback timing set is a k1 set; or a scheduling timing set from a PDCCH transmission to a PUSCH transmission scheduled by the PDCCH, for example, the scheduling timing set is a k2 set.

DCI transmitted in the first channel transmission may be a fallback DCI, for example, DCI format 1_0 and format 0_0, or may also be non-fallback DCI, for example, DCI format 0_1, format 1_1 and format 2_3.

It can be understood that the SCS in step 01 may be the SCS of the first channel, may be the SCS of the second channel, or may be the SCS determined according to the SCS of the first channel and the SCS of the second channel, for example, the larger or smaller one of the SCS of the first channel or the SCS of the second channel. In some embodiments, the SCS obtained above is the SCS of the second channel.

The band indicated by the band information in step 101 may be a band where the first channel is located, may be a band where the second channel is located, or may be a band determined according to the band where the first channel is located and the band where the second channel is located, for example, the high or low band of the band where the first channel is located and the band where the second channel is located. In some embodiments, the band indicated by the band information is the band where the second channel is located.

According to the timing determination method provided by the embodiment of the present disclosure, the required timing set can be determined flexibly by acquiring the first information which includes the SCS, the band information and/or the timing superposition domain, and by determining the timing set from the first channel transmission to the second channel transmission according to the first information, so that under the condition of enlarging the SCS, it can be ensured that the determined scheduling timing or feedback timing among different channel transmissions meets the terminal processing time, and the transmission performance can be performed.

In some embodiments, when the first information obtained above includes a subcarrier spacing, the process of determining the timing set in the step 102 may include:

when the subcarrier spacing is less than or equal to a first subcarrier spacing, determining a first timing set as the timing set; or when the subcarrier spacing is greater than a first subcarrier spacing, determining a second timing set as the timing set.

For example, the first subcarrier spacing is 120 kHz, the corresponding first timing set is {0, 1, 2, 3, 4, . . . , 15}, and the second timing set is {10, 11, 12, 13, 14, . . . , 25}.

In some embodiments, when the first information obtained above includes band information, the process of determining the timing set in the step 102 may include:

when the band indicated by the band information is a first band, determining a third timing set as the timing set; or when the band indicated by the band information is a second band, determining a fourth timing set as the timing set.

For example, the first band is less than or equal to 52.6 GHz, the second band is greater than 52.6 GHz, the corresponding third timing set is {1, 2, 3, 4, 5, 6, 7, 8} and the fourth timing set is {10, 11, 12, 13, 14, 15, 16, 17, 18}.

In some embodiments, in this embodiment, the final timing or timing set can be determined through timing superposition based on the timing superposition domain. The timing superposition domain may be obtained through one of the following:

1) RRC configuration information For example, a timing superposition domain a related to a timing set (such as k1 set) or timing (such as k1) can be configured through RRC.

2) Downlink control information (DCI) For example, a timing superposition domain a related to a timing set (such as k2 set) or timing (such as k2) can be indicated through DCI.

3) A preset implicit mode. For example, the timing superposition domain a can be determined according to the obtained SCS (such as the SCS of the first channel or the SCS of the second channel). For example, the corresponding determination mode is a=[SCS/the first SCS], wherein the first SCS may be preset according to the actual requirement, and [ ] represents upward rounding. In addition to adopting upward rounding, downward rounding may also be adopted.

In some embodiments, when the first information obtained above includes a timing superposition domain, the process of determining the timing set in the step 102 may include:

determining an initial timing set from the first channel transmission to the second channel transmission; and based on a preset rule, processing the initial timing set by using the timing superposition domain to obtain a timing set from the first channel transmission to the second channel transmission.

The initial timing set may be a corresponding existing timing set, for example, a timing set agreed by the current protocol. The preset rule is selected as a preset function. When processing based on the preset function is performed, the determined initial timing set and timing superposition domain may serve as inputs to obtain the final timing set through processing.

In one implementation manner, the preset rule may be selected as an addition function. For example, the final new k1 set is equal to the timing superposition domain a plus the initial k1 set; or the final new k1 is equal to the timing superposition domain a plus the initial k1.

In another implementation manner, the preset rule may be selected as a multiplication function. For example, the final new k1 set is equal to the timing superposition domain a multiplied by the initial k1 set; or the final new k1 is equal to the timing superposition domain a multiplied by the initial k1.

It should be noted that for the first information which is a subcarrier spacing, band information or a timing superposition domain, the corresponding timing determination method may be applied to fallback DCI (such as DCI 1_0) or non-fallback DCI (such as DCI 1_1 and DCI 1_2).

In the embodiments of the present disclosure, the timing set (such as a k0 set, a k1 set or a k2 set) may be configured by network configuration information, and may be configured according to at least one of the following:

a subcarrier spacing or a subcarrier spacing set, for example, different subcarrier spacings correspond to different k1 sets;

a band set, for example, different band sets correspond to different k1 sets;
each Band Width Part (BWP); or
each serving cell.

In one implementation manner, the k1 set is corresponding to PDSCH HARQ-ACK feedback and is scheduled by fallback DCI (such as DCI 1_0) according to network configuration. Preferably, when the fallback DCI is transmitted in a specific search space (such as UE-specific Search Space, USS), the k1 set may be configured through an RRC signaling. When the fallback DCI is transmitted in other specific spaces (such as Common Search Space, CSS), the k1 set may be determined through protocol predefinition.

The present application is described below in detail with reference to the specific embodiments.

Embodiment 1

In the timing determination process in this embodiment 1, a k1 set corresponds to fallback DCI, and the description is as follows:

Case 1: according to SCS of PUCCH, determining the k1 set corresponding to HARQ-ACK feedback of PDSCH reception scheduled or activated by fallback DCI or SPS release indicated by the fallback DCI. For example, for the DCI format 1_0, if the SCS of the PUCCH is less than or equal to 120 kHz, the PDSCH-to-HARQ_feedback timing indicator field value corresponds to {1, 2, 3, 4, 5, 6, 7, 8}, that is, the k1 set is {1, 2, 3, 4, 5, 6, 7, 8}; otherwise, the PDSCH-to-HARQ_feedback timing indicator field value corresponds to {11, 12, 13, 14, 15, 16, 17,18}, that is, the k1 set is {11, 12, 13, 14, 15, 16, 17, 18}.

In this case, if PDSCH reception of UE ends in the slot (or sub-slot) n and PDSCH is scheduled or activated by the DCI format 1_0 or the DCI format 1_0 indicates SPS to release, UE feeds back HARQ-ACK in the slot n+k (or sub-slot n+k), wherein k is provided by the PDSCH-to-HARQ_feedback timing indicator field in the DCI format 1_0. For example, the HARQ_feedback timing indicator field value in the DCI 1_0 is 001, if the SCS of PUCCH is 120 kHz, k is equal to 2; and if the SCS of PUCCH is 960 kHz, k is equal to 12.

Case 2: according to the band where PUCCH is located, determining the k1 set corresponding to HARQ-ACK feedback of PDSCH reception scheduled or activated by fallback DCI or SPS release indicated by the fallback DCI. For example, for the DCI format 1_0, if the band where the PUCCH is located is less than or equal to 52.6 GHz, the PDSCH-to-HARQ_feedback timing indicator field value corresponds to {1, 2, 3, 4, 5, 6, 7, 8}, that is, the k1 set is {1, 2, 3, 4, 5, 6, 7, 8}; otherwise, the PDSCH-to-HARQ_feedback timing indicator field value corresponds to {11, 12, 13, 14, 15, 16, 17, 18}, that is, the k1 set is {11, 12, 13, 14, 15, 16, 17, 18}.

In this case, if PDSCH reception of UE ends in the slot (or sub-slot) n and PDSCH is scheduled or activated by the DCI format 1_0 or the DCI format 1_0 indicates SPS to release, UE feeds back HARQ-ACK in the slot n+k (or sub-slot n+k), wherein k is provided by the PDSCH-to-HARQ_feedback timing indicator field. For example, the HARQ_feedback timing indicator field value in the DCI 1_0 is 001, if the band where PUCCH is located is 2.4 GHz, k is equal to 2; and if the band where PUCCH is located is 57 GHz, k is equal to 12.

It should be noted that the band in the present disclosure may also be the serial number of the band, such as band 1 and band 48. For example, when the band is band A, it corresponds to a set 1; and when the band is band B, it corresponds to a set 2.

Case 3: determining through the existing k1 set and timing superposition domain a. The timing superposition domain a may be obtained through RRC configuration or according to an implicit mode. For example, the timing superposition domain a is obtained according to the SCS of PUCCH. For example, the SCS of PUCCH is equal to 960 kHz (or may be represented as $15*2^\mu$ kHz, such as $15*2^6$ kHz), a=960/SCS1, wherein SCS1 is a value predetermined by a protocol, such as 120 kHz (or may be represented as $15*2^{\mu 0}$ kHz, such as $15*2^3$ kHz), a=960/120=8 (or may be a=[μ/μ0], that is, a=6/3=2).

In this case, if the existing k1 set is {1, 2, 3, 4, 5, 6, 7, 8} and a is equal to 8, the k1 set may be determined to be: {1, 2, 3, 4, 5, 6, 7, 8}+a={9, 10, 11, 12, 13, 14, 15, 16}; or the k1 set may be determined to be: {1, 2, 3, 4, 5, 6, 7, 8}*a={9, 18, 24, 32, 40, 48, 56, 64}.

Case 4: according to network configuration, determining the k1 set corresponding to HARQ-ACK feedback of PDSCH scheduled by fallback DCI.

For example, in this case, it may be configured through an RRC parameter, such as dl-DataToUL-ACK (representing the same as non-fallback DCI configuration) or dl-DataToUL-ACK-forDCI 1-0, that is, the PDSCH-to-HARQ feedback timing indicator field value corresponds to a slot or sub-slot set configured by the parameter dl-DataToUL-ACK or dl-DataToUL-ACK-forDCI1-0. For example, for the PUCCH subcarrier spacing which is less than or equal to a first subcarrier spacing, the range of the value configured by dl-DataToUL-ACK or dl-DataToUL-ACK-forDCI1-0 is {0, 1, 2, 3, ..., 15}, that is, the k1 set is {0, 1, 2, 3, ..., 15}; and for the PUCCH subcarrier spacing which is greater than the first subcarrier spacing, the range of the value configured by dl-DataToUL-ACK or dl-DataToUL-ACK-forDCI1-0 is {10, 11, 12, 13, ..., 25}, that is, the k1 set is {10, 11, 12, 13, ..., 25}.

Embodiment 2

In the timing determination process in this embodiment 2, a k1 set corresponds to non-fallback DCI, and the description is as follows:

Case 1: according to SCS of PUCCH, determining the k1 set corresponding to HARQ-ACK feedback of PDSCH reception scheduled or activated by non-fallback DCI. For example, for the DCI format 1_1, the set corresponding to the PDSCH-to-HARQ_feedback timing indicator field value is configured by an RRC signaling, such as a parameter di-DataToUL-ACK. If the SCS of PUCCH is less than or equal to 120 kHz, DataToUL-ACK is configured in the set 1 such as {0, 1, 2, 3, 4, 5, ..., 15}, otherwise, DataToUL-ACK is configured in the set 2 such as {10, 11, 12, 13, 14, 15, ..., 25}. That is, for DataToUL-ACK, the same codepoint corresponds to different k1 values in different PUCCH SCS.

Case 2: according to the band where PUCCH is located, determining the k1 set corresponding to HARQ-ACK feedback of PDSCH reception scheduled or activated by non-fallback DCI or SPS release indicated by the non-fallback DCI. For example, for the DCI format 1_1, the set corresponding to the PDSCH-to-HARQ_feedback timing indicator field value is configured by an RRC signaling, such as a parameter dl-DataToUL-ACK. If the band where PUCCH is located is less than or equal to 52.6 GHz, DataToUL-ACK is configured in the set 1 such as {0, 1, 2, 3, 4, 5, ..., 15}, otherwise, DataToUL-ACK is configured in the set 2 such as {10, 11, 12, 13, 14, 15, . . . , 25}. That is, for DataToUL-ACK, the same codepoint corresponds to different k1 values in different PUCCH SCS.

Case 3: determining according the existing k1 set and timing superposition domain. The timing superposition domain a may be obtained through RRC configuration or according to an implicit mode. For example, the timing superposition domain a is obtained according to the SCS of PUCCH. For example, the SCS of PUCCH is equal to 960 kHz, a=960/SCS1, wherein SCS1 is a value predetermined by a protocol, such as 120 kHz, a=960/120=8. For example, for the DCI format 1_1, the set corresponding to the PDSCH-to-HARQ_feedback timing indicator field value is configured by an RRC signaling, such as a parameter dl-DataToUL-ACK. DataToUL-ACK is configured in the set {0, 1, 2, 3, 4, 5, . . . , 15}, for example, the configured set is {0, 1, 2, 3, 4, 8, 9, 10}, the k1 set determined based on an addition function is {0, 1, 2, 3, 4, 8, 9, 10}+a={8, 9, 10, 11, 12, 16, 17, 18}; or the k1 set determined based on a multiplication function is {0, 1, 2, 3, 4, 8, 9, 10} *a={0, 8, 16, 24, 32, 64, 72, 80}.

Embodiment 3

In this embodiment 3, during PDSCH scheduling, the Time Domain Resource Assignment (TDRA) in DCI will indicate the time domain resource assignment of PDSCH, wherein TDRA includes k0, a PDSCH mapping type, a start symbol and a length. As follows:

```
PDSCH-TimeDomainResourceAllocationList ::= SEQUENCE
(Size(1..maxNrofDL-Allocations)) OF PDSCH-
TimeDomainResourceAllocation
PDSCH-TimeDomainResourceAllocation ::= SEQUENCE {
    k0                   INTEGER(0..32)       OPTIONAL, -- Need S
    mappingType          ENUMERATED {typeA, typeB},
    startSymbolAndLength INTEGER (0..127)
}
```

Similarly, during PUSCH scheduling, TDRA in DCI includes the time domain resource assignment of PUSCH, including k2, a PUSCH mapping type, a start symbol, and a length. As follows:

```
PUSCH-TimeDomainResourceAllocationList ::= SEQUENCE
(Size(1..maxNrofUL-Allocations)) OF PUSCH-TimeDomainResourceAllocation
    PUSCH-TimeDomainResourceAllocation ::= SEQUENCE {
        k2                   INTEGER(0..32)               OPTIONAL, -- Need S
        mappingType          ENUMERATED {typeA, typeB},
        startSymbolAndLength INTEGER (0..127)
    }
```

Case 1: determining the corresponding k0 set according to SCS of PDSCH. For example, if the SCS of the PDSCH is less than or equal to 120 kHz, the k0 set is INTEGER (0 . . . 32); and if the SCS of the PDSCH is greater than 120 kHz, the k0 set is INTEGER(10 . . . 42).

Similarly, the corresponding k2 set is determined according to the SCS of the PUSCH. For example, if the SCS of the PDSCH is less than or equal to 120 kHz, the k2 set is INTEGER(0 . . . 32); and if the SCS of the PUSCH is greater than 120 kHz, the k2 set is INTEGER(10 . . . 42).

Case 2: determining the corresponding k0 set according to the band where the PDSCH is located. For example, when the band where the PDSCH is located is less than or equal to 52.6 GHz, the set corresponding to k0 is INTEGER(0 . . . 32); and when the band where the PDSCH is located is greater than 52.6 GHz, the set corresponding to k0 is INTEGER(10"42).

Similarly, the corresponding k2 set is determined according to the band where the PUSCH is located. For example, when the band where the PUSCH is located is less than or equal to 52.6 GHz, the set corresponding to k2 is INTEGER(0 . . . 32); and when the band where the PUSCH is located is greater than 52.6 GHz, the set corresponding to k0 is INTEGER(10"42).

In the case 1 or case 2, for different PDSCH/PUCCH SCS/bands, the same codepoint of k0/k1 during TDRA configuration corresponds to different values.

Case 3: determining according to the existing k0 or k2 (set) or timing superposition domain a. The timing superposition domain a may be obtained through RRC configuration or according to an implicit mode. For example, the timing superposition domain a is obtained according to the SCS of PUCCH. For example, the SCS of PUCCH is equal to 960 kHz, a=960/SCS1, wherein SCS1 is a value predetermined by a protocol, such as 120 kHz, a=960/120=8. The TDRA configuration of PDSCH or PUSCH and the range domain of the value corresponding to k0 or k2 are the same as the existing ones. At this time, UE may determine the final k0 or k2 according to the existing k0 or k2 and the timing superposition domain a. For example, UE determines that k0 is equal to 2 according to the TDRA of the PDSCH, the final k0, that is, k0'=k0+a=10, or k0'=k0*a=16.

Figure 2:
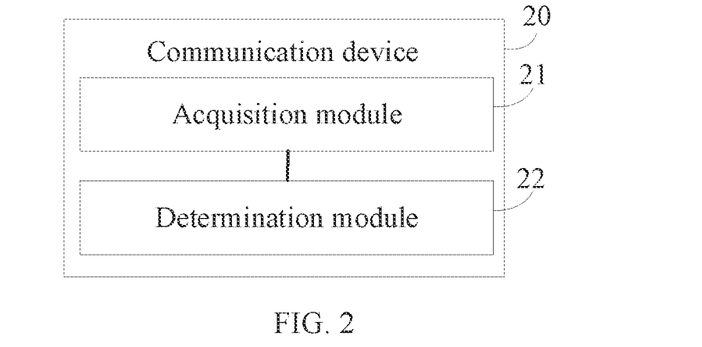
FIG. 2 is a schematic structural diagram of a communication device according to an embodiment of the present disclosure.

Referring to FIG. 2, FIG. 2 is a schematic structural diagram of a communication device according to an embodiment of the present disclosure. The communication device may be a terminal or a network device. As shown in FIG. 2, the communications device 20 includes:

an acquisition module 21, configured to acquire first information, wherein the first information includes at least one of the following: a subcarrier spacing, band information, and a timing superposition domain; or a determination module 22, configured to determine a timing set from a first channel transmission to a second channel transmission according to the first information.

In some embodiments, the timing set from the first channel transmission to the second channel transmission may include one of the following:

a scheduling timing set from a PDCCH transmission to a PDSCH transmission scheduled by the PDCCH, for example, the scheduling timing set is a k0 set;

a feedback timing set from a PDSCH transmission to HARQ-ACK feedback corresponding to the PDSCH transmission, for example, the feedback timing set is a k1 set;

a feedback timing set from a PDCCH transmission to HARQ-ACK feedback corresponding to the PDCCH transmission, wherein the feedback timing set is a k1 set; or a scheduling timing set from a PDCCH transmission to a PUSCH transmission scheduled by the PDCCH, for example, the scheduling timing set is a k2 set.

In some embodiments, the DCI transmitted in the first channel transmission is fallback DCI.

In some embodiments, the first information includes a subcarrier spacing, the determination module 22 is specifically configured to:
when the subcarrier is less than or equal to a first subcarrier spacing, determine a first timing set as the timing set;
or when the subcarrier spacing is greater than a first subcarrier spacing, determine a second timing set as the timing set.

In some embodiments, the first information includes band information, the determination module 22 is specifically configured to:
when a band indicated by the band information is a first band, determine a third timing set as the timing set;
or when the band indicated by the band information is a second band, determine a fourth timing set as the timing set.

In some embodiments, when the first information includes a timing superposition domain, the timing superposition domain is acquired through one of the following:
RRC configuration information, DCI, or a preset implicit mode.

In some embodiments, when the first information includes band information, the determination module 22 includes:
a determination unit, configured to determine an initial timing set from the first channel transmission to the second channel transmission; and
a processing unit, configured to: based on a preset rule, process the initial timing set by using the timing superposition domain to obtain a timing set from the first channel transmission to the second channel transmission.

In some embodiments, the timing set may be configured according to at least one of the following:
a subcarrier spacing or subcarrier spacing set;
a band set;
each bandwidth part; or
each serving cell.

The communication device 20 provided by the embodiments of the present disclosure can implement various processes implemented in the method embodiment shown in FIG. 1. To avoid repetition, details are not described herein again.

The embodiments of the present disclosure further provide a communication device, including a processor, a memory, and a computer program stored in the memory and capable of running on the processor, wherein when the computer program is executed by the processor, various processes of the embodiment shown in FIG. 1 can be implemented. To avoid repetition, details are not described herein again. The communication device may be a terminal or a network device.

Figure 3:
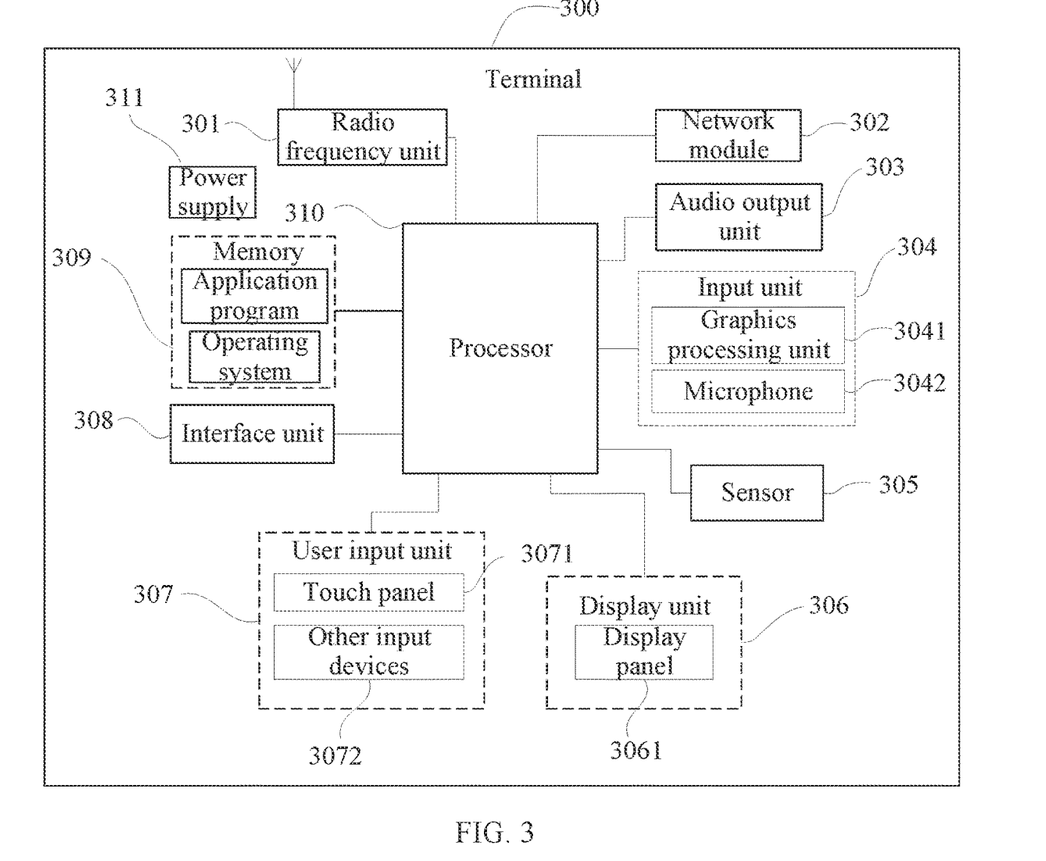
FIG. 3 is a schematic structural diagram of a terminal according to an embodiment of the present disclosure.

Referring to FIG. 3, FIG. 3 is a schematic diagram of a hardware structure of a terminal for implementing the embodiments of the present disclosure. The terminal 300 includes, but is not limited to: components such as a radio frequency unit 301, a network module 302, an audio output unit 303, an input unit 304, a sensor 305, a display unit 306, a user input unit 307, an interface unit 308, a memory 309, a processor 310 and a power supply 311. A person skilled in the art may understand that a structure of the terminal shown in FIG. 3 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 310 is configured to: acquire first information, wherein the first information includes at least one of the following: a subcarrier spacing, band information, or a timing superposition domain; and determine a timing set from a first channel transmission to a second channel transmission according to the first information.

The terminal 300 provided by the embodiments of the present disclosure may implement various processes implemented in the method embodiment shown in FIG. 1. To avoid repetition, details are not described herein again.

It should be understood that, in this embodiment of the present disclosure, the radio frequency unit 301 may be configured to receive and send information or receive and send a signal in a call process. Specifically, after downlink data from a base station is received, the processor 310 processes the downlink data. In addition, uplink data is sent to the base station. Usually, the radio frequency unit 301 includes but is not limited to an antenna, at least one amplifier, a transceiver, a coupler, a low noise amplifier, a duplexer, and the like. In addition, the radio frequency unit 301 may communicate with a network and another device through a wireless communication system.

The terminal provides wireless broadband Internet access to a user through the network module 302, for example, helps the user receive and send e-mails, browse web pages, access streaming media, and the like.

The audio output unit 303 may convert audio data received by the radio frequency unit 301 or the network module 302 or stored in the memory 309 into an audio signal and output the audio signal as a sound. In addition, the audio output unit 303 may further provide an audio output (for example, a call signal received voice, or a message received voice) related to a specific function implemented by the terminal 300. The audio output unit 303 includes a speaker, a buzzer, a telephone receiver, and the like.

The input unit 304 is configured to receive an audio signal or a video signal. The input unit 304 may include a Graphics Processing Unit (GPU) 3041 and a microphone 3042. The graphics processing unit 3041 processes image data of a static picture or a video obtained by an image capture apparatus (such as a camera) in a video capture mode or an image capture mode. A processed image frame may be displayed on the display unit 306. The image frame processed by the graphics processing unit 3041 may be stored in the memory 309 (or another storage medium) or sent by using the radio frequency unit 301 or the network module 302. The microphone 3042 may receive a sound and can process such sound into audio data. Processed audio data may be converted, in a call mode, into a format that can be sent to a mobile communication base station by using the radio frequency unit 301 for output.

The terminal 300 further includes at least one sensor 305, for example, a light sensor, a motion sensor, and another sensor. Specifically, the light sensor includes an ambient light sensor and a proximity sensor. The ambient light sensor may adjust the luminance of the display panel 3061 based on the brightness of ambient light. The proximity sensor may turn off the display panel 3061 and/or backlight when the terminal 300 is moved to an ear. As a type of motion sensor, an accelerometer sensor may detect the magnitude of acceleration in each direction (generally, on three axes), and may detect the magnitude and a direction of gravity when being static. The accelerometer sensor may be used for recognizing a terminal gesture (for example, portrait and landscape orientation switching, a related game, or magnetometer posture calibration), a function related to vibration recognition (for example, a pedometer or a strike), or the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by a user or information provided for a user. The display unit 306 may include a display panel 3061, and the display panel 3061 may be configured in a form of a Liquid Crystal Display (LCD), an Organic Light-Emitting Diode (OLED), or the like.

The user input unit 307 may be configured to receive input digit or character information and generate key signal input related to user setting and function control of the terminal. Specifically, the user input unit 307 includes a touch panel 3071 and another input device 3072. The touch panel 3071 is also referred to as a touchscreen, and may collect a touch operation performed by a user on or near the touch panel 3071 (such as an operation performed by a user on the touch panel 3071 or near the touch panel 3071 by using any proper object or accessory, such as a finger or a stylus). The touch panel 3071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 310, and can receive and execute a command sent by the processor 310. In addition, the touch panel 3071 may be implemented by using a plurality of types such as a resistive type, a capacitive type, an infrared ray, and a surface acoustic wave. In addition to the touch panel 3071, the user input unit 307 may further include another input device 3072. Specifically, the another input device 3072 may include but is not limited to: a physical keyboard, a function button (such as a volume control button, a switch button), a trackball, a mouse, and a joystick, which is not described herein.

Further, the touch panel 3071 can cover the display panel 3061. When detecting a touch operation on or near the touch panel, the touch panel 3071 transmits the touch operation to the processor 310 to determine a type of a touch event. Then the processor 310 provides corresponding visual output on the display panel 3061 based on the type of the touch event. In FIG. 3, the touch panel 3071 and the display panel 3061 are used as two independent components to implement input and output functions of the terminal. However, in some embodiments, the touch panel 3071 and the display panel 3061 may be integrated to implement the input and output functions of the terminal. This is not specifically limited herein.

The interface unit 308 is an interface connecting an external apparatus to the terminal 300. For example, the external apparatus may include a wired or wireless headset port, an external power supply (or a battery charger) port, a wired or wireless data port, a storage card port, a port configured to connect to an apparatus having an identification module, an audio input/output (I/O) port, a video I/O port, a headset port, and the like. The interface unit 308 may be configured to receive input (for example, data information and power) from an external apparatus and transmit the received input to one or more elements within the terminal 300, or may be configured to transmit data between the terminal 300 and the external device.

The memory 309 may be configured to store a software program and various data. The memory 309 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 309 may include a high-speed random access memory, and may further include a nonvolatile memory, for example, at least one magnetic disk storage device, a flash storage device, or another volatile solid-state storage device.

The processor 310 is a control center of the terminal, and connects all parts of the entire terminal by using various interfaces and lines. By running or executing a software program and/or a module stored in the memory 309 and invoking data stored in the memory 309, the processor performs various functions of the terminal and data processing, to perform overall monitoring on the terminal. The processor 310 may include one or more processing units. The processor 310 may be integrated with an application processor and a modem processor. The application processor mainly processes an operating system, a user interface, an application, and the like. The modem processor mainly processes wireless communication. It can be understood that, alternatively, the modem processor may not be integrated into the processor 310.

The terminal 300 may further include a power supply 311 (such as a battery) that supplies power to each component. The power supply 311 may be logically connected to the processor 310 by using a power management system, to implement functions such as charging, discharging, and power consumption management by using the power management system.

In addition, the terminal 300 may further include some function modules not shown, and details are not described herein.

Figure 4:
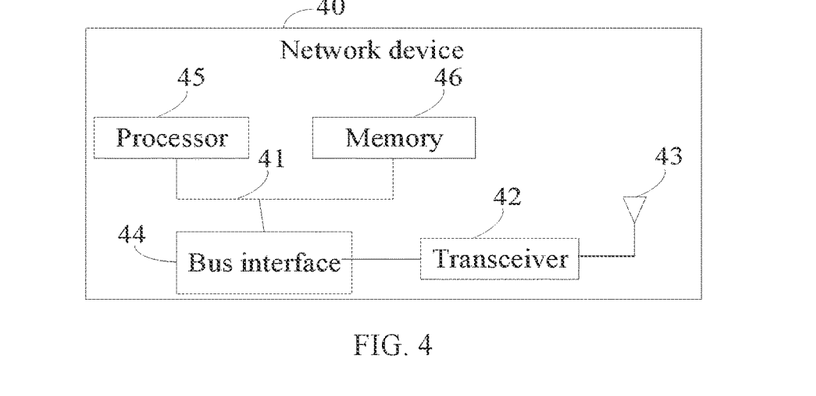
FIG. 4 is a schematic structural diagram of a network device according to an embodiment of the present disclosure.

Referring to FIG. 4, FIG. 4 is a schematic diagram of a hardware structure of a network device for implementing the embodiments of the present disclosure. The network device 40 includes but is not limited to a bus 41, a transceiver 42, an antenna 43, a bus interface 44, a processor 45 and a memory 46.

In the embodiments of the present disclosure, the network device 40 further includes: a computer program stored in the memory 46 and capable of running on the processor 45. In some embodiments, when the computer program is executed by the processor 45, the following steps are implemented:
   acquiring first information, wherein the first information includes at least one of the following: a subcarrier spacing, band information, or a timing superposition domain; and
   determining a timing set from a first channel transmission to a second channel transmission according to the first information.

The transceiver 42 is configured to receive and send data under control of the processor 45.

The network device 40 provided by the embodiments of the present disclosure may implement various processes implemented by the method embodiment shown in FIG. 1. To avoid repetition, details are not described herein again.

In FIG. 4, for a bus architecture (represented by a bus 41), the bus 41 may include any quantity of interconnecting buses and bridges, and the bus 41 interconnects various circuits of one or more processors represented by the processor 45 and a memory represented by a memory 46. The bus 41 may further link together various other circuits, such as a peripheral device, a voltage regulator, and a power management circuit. These are all well known in the art. Therefore, this specification provides no further description. The bus interface 44 provides an interface between the bus 41 and the transceiver 42. The transceiver 42 may be one component or may be a plurality of components, for example, a plurality of receivers and transmitters, and provide a unit that is configured to communicate with various other apparatuses on a transmission medium. Data processed by the processor 45 is transmitted on a wireless medium by using the antenna 43. Further, the antenna 43 further receives data and transmits the data to the processor 45.

The processor 45 is responsible for managing the bus 41 and general processing, and may further provide various functions, including timing, peripheral interfacing, voltage regulation, power management, and another control function. The memory 46 may be configured to store data used by the processor 45 when performing an operation.

Optimally, the processor 45 may be a CPU, an ASIC, an FPGA, or a CPLD.

The embodiments of the present disclosure further provide a computer readable storage medium. The computer readable storage medium stores a computer program. When the computer program is executed by a processor, various processes in the embodiment shown in FIG. 1 are implemented, and a same technical effect can be achieved. To avoid repetition, details are not described herein again. The computer readable storage medium is, for example, a Read-only Memory (ROM), a Random Access Memory (RAM), a magnetic disk, an optical disk, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A timing determination method, comprising:
    acquiring first information, wherein the first information comprises a subcarrier spacing of a Physical Uplink Control Channel (PUCCH); and
    determining a timing set from a first channel transmission to a second channel transmission according to the first information,
    wherein downlink control information (DCI) transmitted in the first channel transmission is fallback DCI, determining the timing set from the first channel transmission to the second channel transmission according to the first information comprises:
    determining the timing set from the first channel transmission to the second channel transmission according to a comparison of the subcarrier spacing of the PUCCH with a first subcarrier spacing.

2. The timing determination method according to claim 1, wherein the timing set from the first channel transmission to the second channel transmission comprises one of the following:
    a scheduling timing set from a physical downlink control channel (PDCCH) transmission to a physical downlink shared channel (PDSCH) transmission scheduled by the PDCCH;
    a feedback timing set from a PDSCH transmission to hybrid automatic repeat request-ACK (HARQ-ACK) feedback corresponding to the PDSCH transmission;
    a feedback timing set from a PDCCH transmission to HARQ-ACK feedback corresponding to the PDCCH transmission; or
    a scheduling timing set from a PDCCH transmission to a physical uplink shared channel (PUSCH) transmission scheduled by the PDCCH.

3. The timing determination method according to claim 1, wherein the step of determining the timing set from the first channel transmission to the second channel transmission according to a comparison of the subcarrier spacing of the PUCCH with the first subcarrier spacing comprises:
    when the subcarrier is less than or equal to a first subcarrier spacing, determining a first timing set as the timing set; or
    when the subcarrier spacing is greater than a first subcarrier spacing, determining a second timing set as the timing set.

4. The timing determination method according to claim 1, wherein the first information further comprises band information, the step of determining the timing set from the first channel transmission to the second channel transmission according to the first information comprises:
    when a band indicated by the band information is a first band, determining a third timing set as the timing set; or
    when the band indicated by the band information is a second band, determining a fourth timing set as the timing set.

5. The timing determination method according to claim 1, wherein the first information further comprises timing superposition domain, the timing superposition domain is acquired through one of the following:
    radio resource control (RRC) configuration information;
    downlink control information (DCI); or
    a preset implicit mode.

6. The timing determination method according to claim 1, wherein the first information further comprises timing superposition domain, the step of determining the timing set from the first channel transmission to the second channel transmission according to the first information comprises:
  determining an initial timing set from the first channel transmission to the second channel transmission; and
  based on a preset rule, processing the initial timing set by using the timing superposition domain to obtain a timing set from the first channel transmission to the second channel transmission.

7. The timing determination method according to claim 1, wherein the timing set is configured according to at least one of the following:
  a subcarrier spacing or subcarrier spacing set;
  a band set;
  each bandwidth part; or
  each serving cell.

8. A communication device, comprising: a memory storing a computer program; and a processor coupled to the memory and configured to execute the computer program to perform a timing determination method, the method comprising:
  acquiring first information, wherein the first information comprises a subcarrier spacing of a Physical Uplink Control Channel (PUCCH); and
  determining a timing set from a first channel transmission to a second channel transmission according to the first information,
  wherein downlink control information (DCI) transmitted in the first channel transmission is fallback DCI, determining the timing set from the first channel transmission to the second channel transmission according to the first information comprises:
  determining the timing set from the first channel transmission to the second channel transmission according to a comparison of the subcarrier spacing of the PUCCH with a first subcarrier spacing.

9. The communication device according to claim 8, wherein the timing set from the first channel transmission to the second channel transmission comprises one of the following:
  a scheduling timing set from a physical downlink control channel (PDCCH) transmission to a physical downlink shared channel (PDSCH) transmission scheduled by the PDCCH;
  a feedback timing set from a PDSCH transmission to hybrid automatic repeat request-ACK (HARQ-ACK) feedback corresponding to the PDSCH transmission;
  a feedback timing set from a PDCCH transmission to HARQ-ACK feedback corresponding to the PDCCH transmission; or
  a scheduling timing set from a PDCCH transmission to a physical uplink shared channel (PUSCH) transmission scheduled by the PDCCH.

10. The communication device according to claim 8, wherein the step of determining the timing set from the first channel transmission to the second channel transmission according to a comparison of the subcarrier spacing of the PUCCH with the first subcarrier spacing comprises:
  when the subcarrier is less than or equal to a first subcarrier spacing, determining a first timing set as the timing set; or
  when the subcarrier spacing is greater than a first subcarrier spacing, determining a second timing set as the timing set.

11. The communication device according to claim 8, wherein the first information further comprises band information, the step of determining the timing set from the first channel transmission to the second channel transmission according to the first information comprises:
  when a band indicated by the band information is a first band, determining a third timing set as the timing set; or
  when the band indicated by the band information is a second band, determining a fourth timing set as the timing set.

12. The communication device according to claim 8, wherein the first information further comprises timing superposition domain, the timing superposition domain is acquired through one of the following:
  radio resource control (RRC) configuration information;
  downlink control information (DCI); or
  a preset implicit mode.

13. The communication device according to claim 8, wherein the first information further comprises timing superposition domain, the step of determining the timing set from the first channel transmission to the second channel transmission according to the first information comprises:
  determining an initial timing set from the first channel transmission to the second channel transmission; and
  based on a preset rule, processing the initial timing set by using the timing superposition domain to obtain a timing set from the first channel transmission to the second channel transmission.

14. The communication device according to claim 8, wherein the timing set is configured according to at least one of the following:
  a subcarrier spacing or subcarrier spacing set;
  a band set;
  each bandwidth part; or
  each serving cell.

15. A non-transitory computer-readable storage medium, storing a computer program, when the computer program is executed by a processor to perform:
  acquiring first information, wherein the first information comprises a subcarrier spacing of a Physical Uplink Control Channel (PUCCH); and
  determining a timing set from a first channel transmission to a second channel transmission according to the first information,
  wherein downlink control information (DCI) transmitted in the first channel transmission is fallback DCI, determining the timing set from the first channel transmission to the second channel transmission according to the first information comprises:
  determining the timing set from the first channel transmission to the second channel transmission according to a comparison of the subcarrier spacing of the PUCCH with a first subcarrier spacing.

16. The non-transitory computer-readable storage medium according to claim 15, wherein the timing set from the first channel transmission to the second channel transmission comprises one of the following:
  a scheduling timing set from a physical downlink control channel (PDCCH) transmission to a physical downlink shared channel (PDSCH) transmission scheduled by the PDCCH;
  a feedback timing set from a PDSCH transmission to hybrid automatic repeat request-ACK (HARQ-ACK) feedback corresponding to the PDSCH transmission;
  a feedback timing set from a PDCCH transmission to HARQ-ACK feedback corresponding to the PDCCH transmission; or a scheduling timing set from a PDCCH transmission to a physical uplink shared channel (PUSCH) transmission scheduled by the PDCCH.

17. The non-transitory computer-readable storage medium according to claim 15, wherein the step of determining the timing set from the first channel transmission to the second channel transmission according to a comparison of the subcarrier spacing of the PUCCH with the first subcarrier spacing comprises:
when the subcarrier is less than or equal to a first subcarrier spacing, determining a first timing set as the timing set; or
when the subcarrier spacing is greater than a first subcarrier spacing, determining a second timing set as the timing set.

18. The non-transitory computer readable storage medium according to claim 15, wherein the first information further comprises band information, the step of determining the timing set from the first channel transmission to the second channel transmission according to the first information comprises:
when a band indicated by the band information is a first band, determining a third timing set as the timing set; or
or when the band indicated by the band information is a second band, determining a fourth timing set as the timing set.

* * * * *